United States Patent
Aizawa et al.

(10) Patent No.: US 11,579,089 B2
(45) Date of Patent: Feb. 14, 2023

(54) RAMAN MICROSCOPE HAVING FLUORESCENCE OBSERVATION FUNCTION AND FILTER UNIT

(71) Applicant: JASCO CORPORATION, Tokyo (JP)

(72) Inventors: Kento Aizawa, Tokyo (JP); Takeo Soejima, Tokyo (JP); Tsutomu Inoue, Tokyo (JP)

(73) Assignee: JASCO CORPORATION, Tokyo (JP)

( * ) Notice: Subject to any disclaimer, the term of this patent is extended or adjusted under 35 U.S.C. 154(b) by 75 days.

(21) Appl. No.: 17/119,272

(22) Filed: Dec. 11, 2020

(65) Prior Publication Data
US 2021/0190692 A1    Jun. 24, 2021

(30) Foreign Application Priority Data
Dec. 17, 2019    (JP) .............................. JP2019-227349

(51) Int. Cl.
| | |
|---|---|
| *G01N 21/64* | (2006.01) |
| *G01N 21/65* | (2006.01) |
| *G02B 21/16* | (2006.01) |
| *G02B 21/12* | (2006.01) |
| *G01N 21/88* | (2006.01) |

(52) U.S. Cl.
CPC ......... *G01N 21/6458* (2013.01); *G01N 21/65* (2013.01); *G02B 21/125* (2013.01); *G02B 21/16* (2013.01); *G01N 2021/8887* (2013.01)

(58) Field of Classification Search
CPC ............... G01N 21/6458; G01N 21/65; G01N 2021/8887; G02B 21/125; G02B 21/16
See application file for complete search history.

(56) References Cited

U.S. PATENT DOCUMENTS

| | | | |
|---|---|---|---|
| 2004/0127778 A1* | 7/2004 | Lambert | A61B 5/14532 600/318 |
| 2006/0184037 A1* | 8/2006 | Ince | A61B 1/0607 600/476 |

(Continued)

FOREIGN PATENT DOCUMENTS

| | | |
|---|---|---|
| JP | 2006-81842 A | 3/2006 |
| JP | 2017-219400 A | 12/2007 |

OTHER PUBLICATIONS

"Case study of fluorescene avoiding measurement using 457 nm laser", [online], Jasco Corporation, [searched on Jul. 24, 2019], Internet <URL: https://www.jasco.co.jp/jpn/technique/applicationdata/PDF/Raman/260-AN-0012.pdf>, with English translation.

(Continued)

*Primary Examiner* — Blake C Riddick
(74) *Attorney, Agent, or Firm* — Greenblum & Bernstein, P.L.C.

(57) ABSTRACT

A filter unit for a Raman microscope mounted with a dark-field objective lens unit includes a frame body, a plurality of UV-LED elements that is disposed around a window part of the frame body to emit UV light, and a long-pass filter that is supported to the frame body to cover the window part of the frame body and transmits a light having a wavelength longer than the wavelength of the UV light. The filter unit has a dark-field UV irradiation function, and is able to impart a fluorescence observation function to the Raman microscope.

8 Claims, 11 Drawing Sheets

(56) References Cited

U.S. PATENT DOCUMENTS

| | | | |
|---|---|---|---|
| 2010/0091287 A1* | 4/2010 | Power | G02B 21/0064 |
| | | | 356/417 |
| 2015/0355448 A1* | 12/2015 | Edwards | G02B 27/141 |
| | | | 359/390 |
| 2017/0138860 A1* | 5/2017 | Huang | G01N 21/65 |
| 2017/0351077 A1 | 12/2017 | Tamano | |

OTHER PUBLICATIONS

"Minimizing fluorescence using a 457nm laser excitation wavelength" Jasco Corporation, [searched on Jul. 24, 2019].

Office Action issued in Japan Counterpart Patent Appl. No. 2019-227349, dated Jun. 2, 2020, along with an English translation thereof.

U.S. Appl. No. 17/142,635 to Kento Aizawa et al., filed Jan. 6, 2021.

* cited by examiner

FIG. 6A
BRIGHT-FIELD VISIBLE OBSERVATION MODE
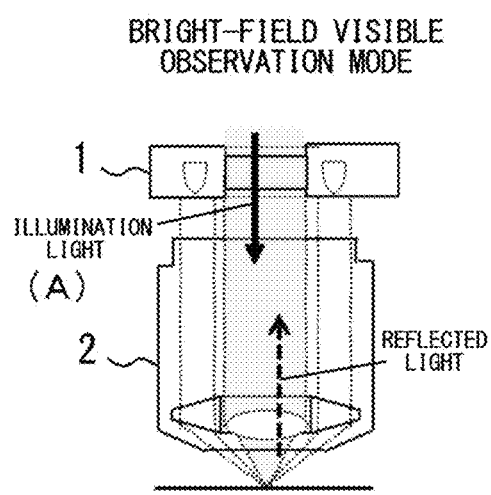
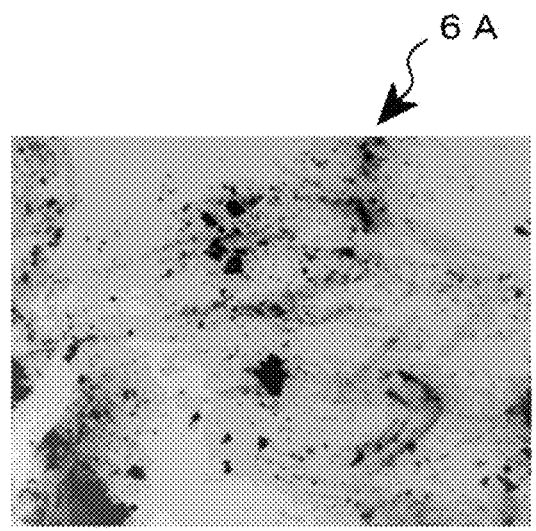
FIG. 6B
DARK-FIELD FLUORESCENCE OBSERVATION MODE
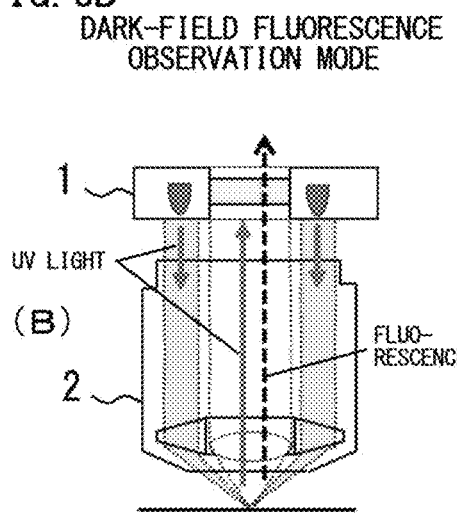
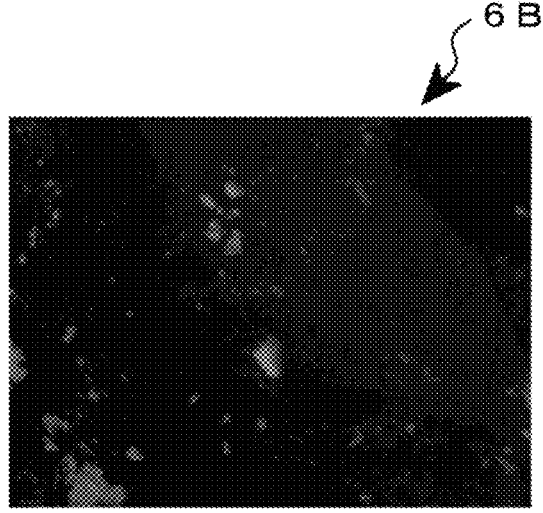

FIG. 7

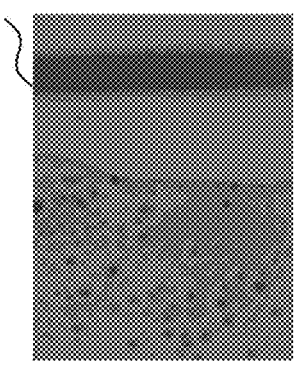

7A — VISIBLE OBSERVATION IMAGE OF FLUORESCENT PIGMENT

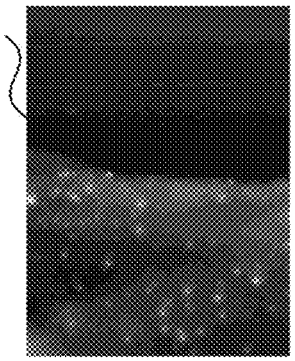

7B — 375nm LED IRRADIATION

DISASSEMBLE INTO FLUORESCENT IMAGES OF THREE COLORS BY RGB COLOR FILTERS

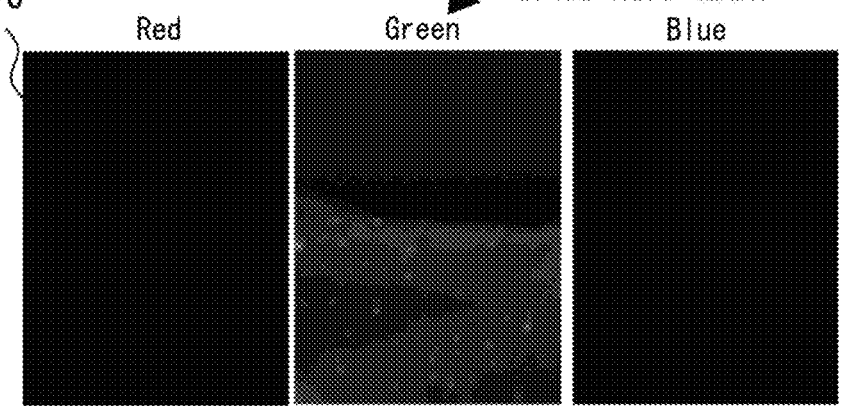

7C — Red / Green / Blue

⇒ INTENSITY OF GREEN COMPONENT IS STRONG
⇒ 532nm EXCITATION IS UNSUITABLE
⇒ 785nm EXCITATION SHOULD BE SELECTED

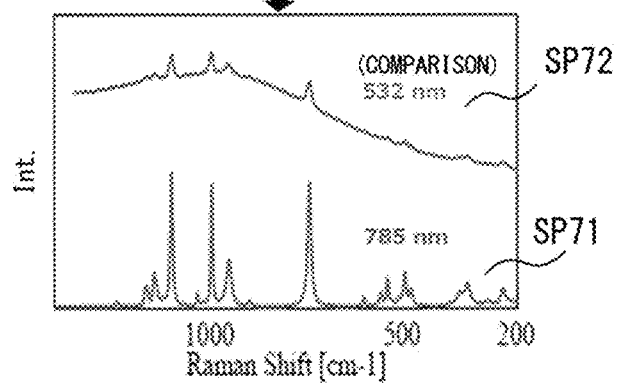

SP72 (COMPARISON) 532 nm
SP71 785 nm

RESULT OF SELECTING A SUITABLE EXCITATION LASER
(EXAMPLE OF AVOIDING FLUORESCENCE BY 785nm EXCITATION)

(A)

(B)

(C)

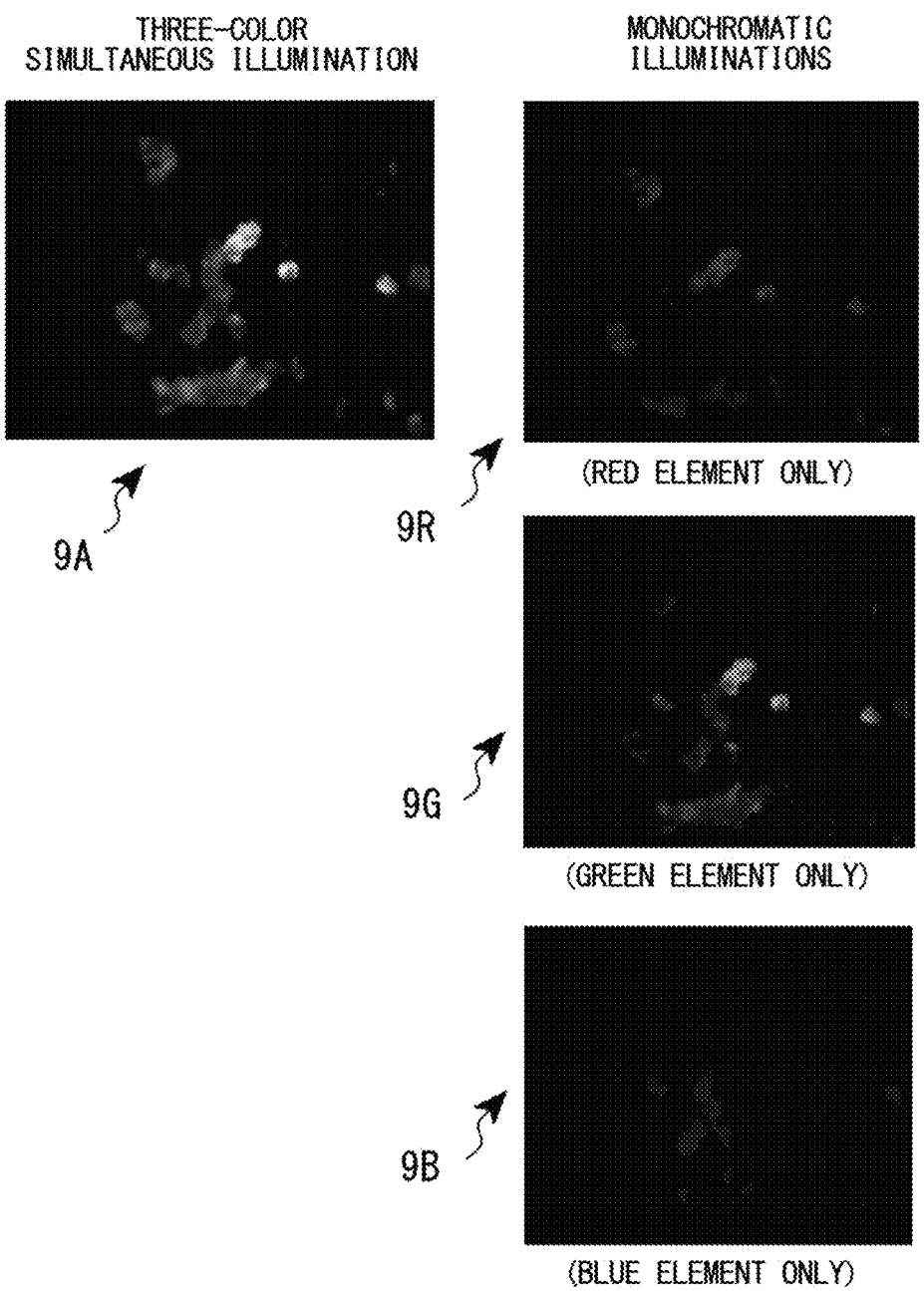

(A)

(B)

RAMAN MICROSCOPE HAVING FLUORESCENCE OBSERVATION FUNCTION AND FILTER UNIT

RELATED APPLICATIONS

This application claims the priority of Japanese Patent Application No. 2019-227349 filed on Dec. 17, 2019, the disclosure of which is incorporated herein by reference in its entirety.

FIELD OF THE INVENTION

The present invention relates to a filter unit for imparting a fluorescence observation function to a Raman microscope, and a Raman microscope comprising the same.

BACKGROUND OF THE INVENTION

In Raman spectral measurement (Raman observation), an optical spectrum of a Raman scattering light of a sample is observed. When a laser light having a certain excitation wavelength is emitted onto the sample, the light becomes a light having a different wavelength by molecular vibration of the sample to be scattered. This is a Raman scattering light.

On the other hand, since the sample has various fluorescence properties to ultra-violet lights and visible lights, a fluorescence in accordance with the laser light is emitted from the sample. In Raman observation, it is general that, when self-fluorescence of the sample is strong, the Raman scattering light and the fluorescence overlap, and an extremely weak Raman peak of Raman spectra becomes buried in fluorescent spectra.

Accordingly, there is a Raman microscope that can select a laser light having the optimal excitation wavelength in accordance with the sample, and is mounted with a plurality of types of excitation lasers that are switchable. This is described in Non-Patent Literature 1 as follows: "When the sample itself emits a fluorescence, changing the laser excitation wavelength is most effective. Although the wavelength of the Raman scattering light varies depending on the excitation wavelength, the wavelength of fluorescence does not depend on the excitation wavelength. Accordingly, overlapping of the Raman scattering light and the fluorescence can be avoided and reduced by changing the excitation wavelength. Since a Raman spectrum is expressed by a shift value from the excitation wavelength, a Raman peak of the same position can be obtained even when the excitation wavelength is changed, and a spectrum having a reduced influence of the fluorescence can be obtained purely. (abbreviated) As described, one of three wavelengths including a 457 nm laser on the short wavelength side in addition to a standard 532 nm laser and a 785 nm laser on the long wavelength side that is used conventionally, is used depending on the sample".

CITATION LIST

Non-Patent Literature

NON-PATENT LITERATURE 1: "Case study of fluorescence avoiding measurement using 457 nm laser", [online], JASCO CORPORATION, [searched on Jul. 24, 2019], Internet <URL: https://www.jasco.co.jp/jpn/technique/applicationdata/PDF/Raman/260-AN-0012.pdf>

DISCLOSURE OF THE INVENTION

Problem to be Solved by the Invention

Thus, the present inventors have been studying on a method of performing Raman observation, the method of which, when a sample of measurement target is determined, fluorescence observation is performed to the sample as a preliminary measurement, and based on the result thereof, a laser light having an optimal excitation wavelength is selected to perform Raman observation which is the present measurement. If it is possible to predict a wavelength range of fluorescence emitted from the sample when the sample is irradiated with a certain excitation wavelength laser light by fluorescence observation, the excitation laser of which the wavelength of fluorescence and the wavelength of the Raman scattering light do not overlap can be selected.

However, if an optical element necessary for fluorescence observation of the sample is simply to be added, a Raman microscope will be complicated and increased in size. To introduce a fluorescence observation function inside a laser Raman microscope, it is necessary to provide a light source (such as mercury lamps, deuterium lamps, etc.) in the microscope, a dichroic mirror and the like to irradiate a specific wavelength light to the sample, and an absorption filter in order to take out fluorescent components from the sample. Moreover, an optical switch of the lasers and the fluorescence observation light source, or a switching mechanism for providing the absorption filter on an optical path to an observation camera becomes necessary.

The object of the present invention is to impart a fluorescence observation function to a Raman microscope without complication and increase in size.

Means to Solve the Problem

The present inventors developed a dark-field UV irradiation type filter unit with a long-pass filter that can be easily mounted to a Raman microscope.

That is, a filter unit according to the present invention is a filter unit for a Raman microscope mounted with a dark-field objective lens unit, the filter unit comprises:
  a frame body;
  a plurality of UV light emitting elements that is disposed around a window part of the frame body to emit UV light; and
  a long-pass filter that is supported to the frame body to cover the window part of the frame body, and transmits a light having a wavelength longer than the wavelength of the UV light. The filter unit has a dark-field UV irradiation function, and is able to impart a fluorescence observation function to the Raman microscope.

Here, in addition to the UV light-emitting elements, at least one set of RGB light emitting elements or at least one full-color light emitting element is preferably disposed around the window part. Moreover, in addition to the UV light emitting elements, a mercury lamp and/or a neon lamp as a reference light source for calibration of the Raman microscope is preferably disposed around the window part. Moreover, the long-pass filter is preferably a gradation filter of which a wavelength range of transmission varies in accordance with a position, and is preferably supported to be shiftable along a changing direction of the wavelength range in the window part.

The filter unit having such configuration is characterized by comprising both of a dark-field UV irradiation function and a long-pass filter function. The Raman microscope mounted with the dark-field objective lens unit of the present invention is characterized by comprising the above-identified filter unit.

According to such Raman microscopic configuration, the filter unit is disposed on the optical axis of the dark-field objective lens unit (including at least the bright-field lens and the ring-shaped lens), in other words, on the optical axis on the side opposite to the sample side with this dark-field objective lens unit at a center. A UV light (also referred to as a dark-field UV light) is emitted from the UV light emitting elements of the filter unit toward the ring-shaped lens of the dark-field objective lens unit. Since the UV light is condensed to a measurement point on the sample by the ring-shaped lens, a fluorescence in accordance with a fluorescence property of the measurement point is generated. This fluorescence from the sample is condensed by the bright-field objective lens that is positioned on the optical axis of the dark-field objective lens unit, and proceeds toward the long-pass filter of the filter unit. The rebounded UV light from the sample is eliminated by the long-pass filter, and the fluorescence from the sample proceeds towards a visible observation optical system of the Raman microscope. The Raman microscope comprises a laser irradiation optical system, a Raman observation optical system, and a visible observation optical system, for example, and the fluorescence that passed through the long-pass filter is observed by the visible observation optical system. In ordinary Raman observation, a laser light from the laser irradiation optical system is emitted to the sample, and the Raman scattering light from the sample can be observed by the Raman observation optical system.

Effect of the Invention

According to the configuration of the present invention, dark-field fluorescence observation of a sample using a dark-field UV light becomes possible by only mounting a filter unit to a Raman microscope mounted with a dark-field objective lens unit. Accordingly, a fluorescence observation function can be imparted to the Raman microscope without complication or increase in size.

Moreover, the Raman microscope configured as described above performs dark-field fluorescence observation with the filter unit, so that an excitation laser suitable for measuring Raman spectra can be selected.

BRIEF DESCRIPTION OF DRAWINGS

FIG. 6A shows a measurement example by a bright-field visible observation mode using the Raman microscope, and FIG. 6B shows a measurement example by a dark-field fluorescence observation mode.

FIG. 7 shows procedures of selecting an excitation wavelength by the Raman microscope.

FIG. 9 shows observation images for comparison of the sample of a case when the sample is irradiated simultaneously with three colors by RGB light emitting elements, and a case when the sample is irradiated monochromatically.

BEST MODE FOR CARRYING OUT THE INVENTION

Filter Unit

Figure 1:
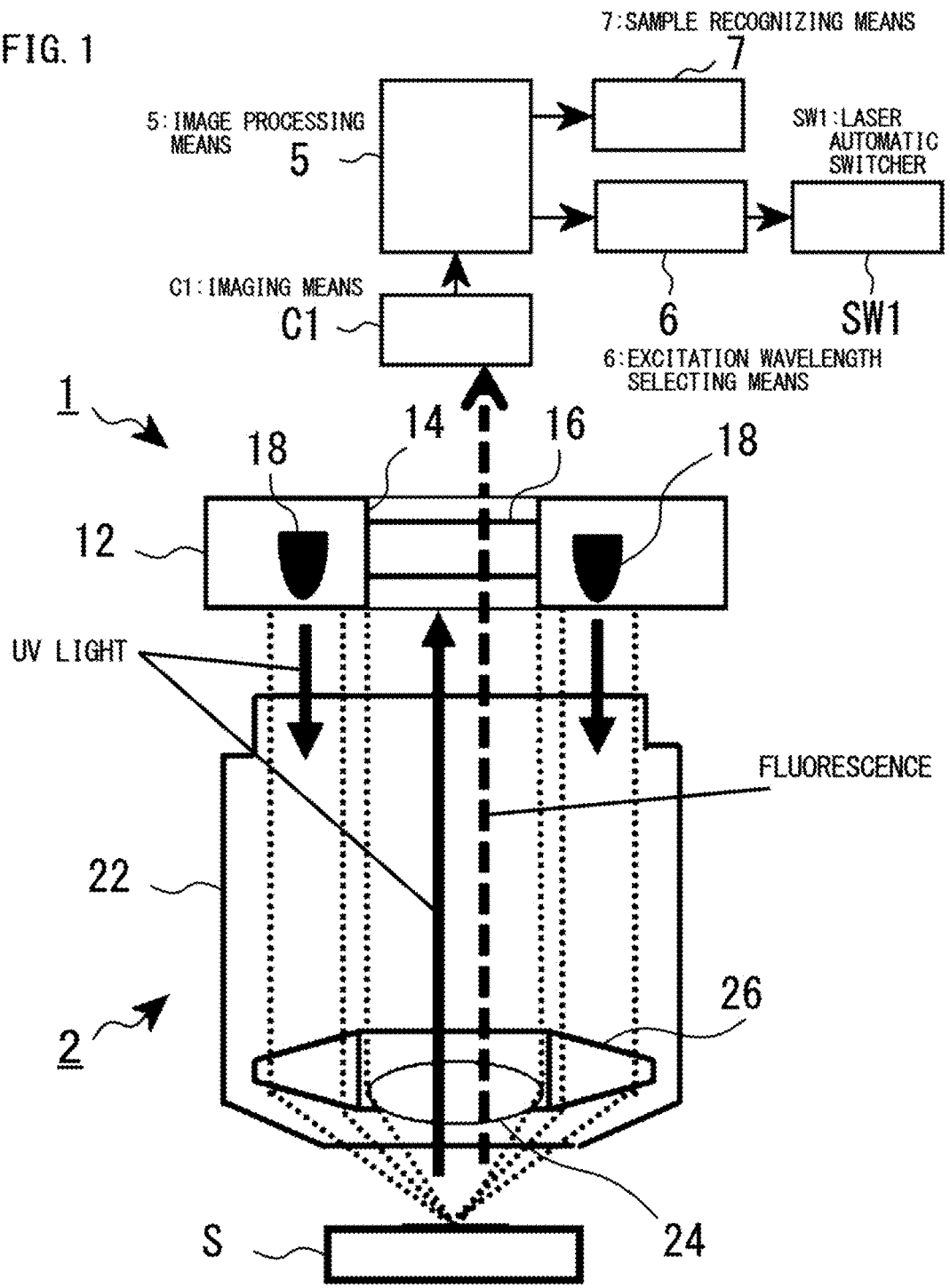
FIG. 1 shows the positional relationship between a filter unit according to one embodiment and a dark-field objective lens unit.
Figure 2:
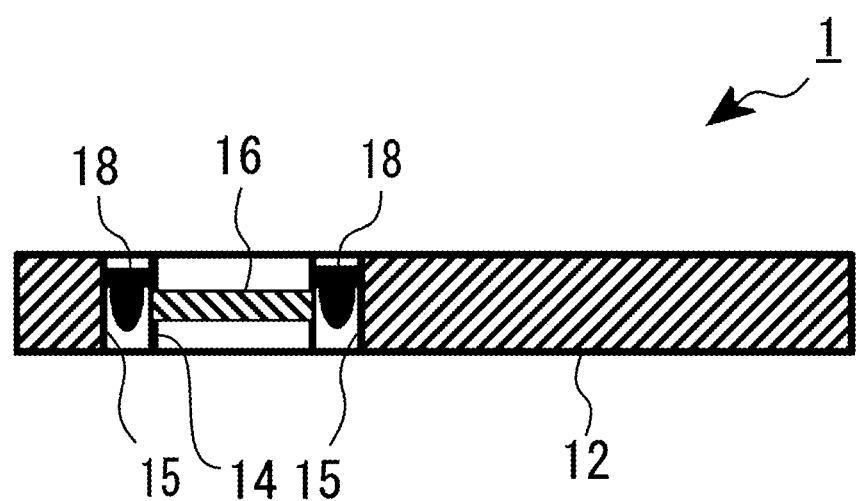
FIG. 2 shows a cross-sectional view of the filter unit cut along a vertical plane.
Figure 3:
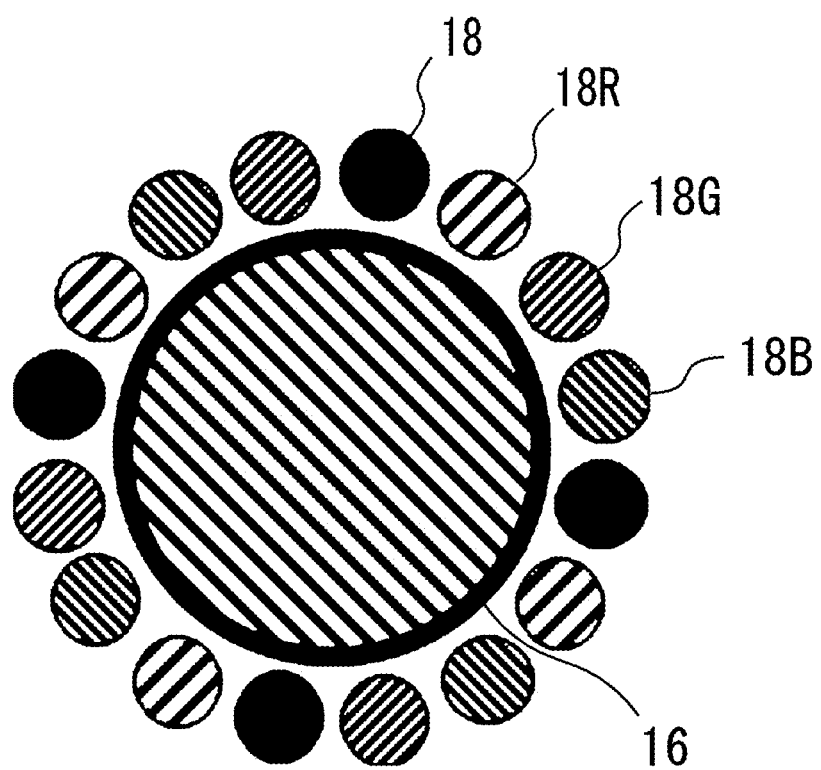
FIG. 3 shows a ring-shaped alignment of light emitting elements of the filter unit.

First, a configuration of a filter unit 1 according to the present embodiment is described based on FIG. 1 to FIG. 3. FIG. 1 shows the positional relationship between a dark-field objective lens unit 2 and the filter unit 1 of a Raman microscope. FIG. 2 is a cross-sectional view that shows a schematic configuration of the filter unit 1.

The filter unit 1 is a filter unit with a dark-field UV irradiation function, and comprises: a frame body 12; a long-pass filter 16 supported to the frame body to cover a window part 14 of the frame body 12; and a plurality of UV-LED elements 18 disposed around the window part 14.

In FIG. 1, the frame body 12 is shown as a plate-shaped portion having the window part 14 that penetrates through the front and back faces; however, the shape and the size of the frame body 12 and the position and the size of the window part 14 relative to the whole frame body 12 can be determined freely. The shape and the size of the frame body 12 and the position and the size of the window part 14 are usually determined in a range such that the frame body 12 can be mounted to supporting portions of the objective lens in the Raman microscope such as revolvers.

The long-pass filter 16 is a filter that transmits at least a light on the long wavelength side than the UV light emitted by the UV-LED elements 18, and it prevents the UV light rebounded by the sample S entering various observation optical systems of the Raman microscope. It is the so-called UV cutting filter.

At least two UV-LED elements 18 are disposed around the window part 14. Two to several tens of LED elements 18 may be disposed around the window part. These LED elements 18 are usually disposed at equal intervals, but it is not limited thereto.

The LED elements 18 are fixed to the frame body 12 so that its irradiation direction becomes almost perpendicular to one face of the frame body 12 including a filter face. The wavelength range of the UV light from the LED elements 18 is preferably a wavelength shorter than a visible light. When an excitation laser of the UV range is installed to the Raman microscope, the wavelength range of the UV light from the LED elements 18 may be a wavelength shorter than the excitation wavelength from the excitation laser.

As shown in FIG. 1, the filter unit 1 is mounted to a revolver or the like of the microscope such that a central axis of a filter 16 supported by a through hole (window part 14) matches an axis of the dark-field objective lens unit 2. Here, the irradiation direction of the UV-LED elements 18 faces toward the side of the dark-field objective lens unit 2.

As shown in FIG. 1, the dark-field objective lens unit 2 mounted to the revolver of the microscope has: a tubular case 22; a bright-field lens 24 disposed on a central axis the tubular case 22; and a ring-shaped lens 26 that surrounds the bright-field lens 24.

The cross-sectional view of FIG. 2 shows a schematic configuration of the filter unit 1. As shown in FIG. 2, the frame body 12 of the filter unit 1 is stick-shaped, and has a through hole (window part 14) at a position deviated to one end than the center in a longitudinal direction. The long-pass filter 16 is supported to this window part 14. An edge of the long-pass filter 16 may be placed on a step formed on an inner wall of the window part 14, or a portion to prevent falling may be attached to the window part 14 to oppose to the placed long-pass filter 16 so that the long-pass filter 16 does not fall from the window part 14. In any case, it is configured not to impart unnecessary stress to the long-pass filter 16.

When the user holds somewhere around the other end of the stick-shaped frame body 12 and inserts the filter unit 1 to a hole formed to the revolver, the filter 16 of the filter unit 1 is disposed onto the optical axis of the microscope. When the filter is exchanged to another filter, the user only has to pull out the entire filter unit 1 from the revolver, and mount a long-pass filter of different characteristics or another filter unit having light emitting elements or lamps of different characteristics. Therefore, the filter can be exchanged easily.

Moreover, a plurality of spaces 15 that stores various LED elements including the UV-LED element 18 and small lamps is formed around the window part 14. FIG. 3 shows the positional relationship between various LED elements and small lamps disposed in a ring-shape around the filter 16. The circular filter 16 is detachable to the window part 14, and is exchangeable. Other than the UV-LED elements 18, red LED elements (18R), green LED elements (18G), and blue LED elements (18B) are disposed around the filter 16.

Although it is not shown in FIG. 3, these LED elements of three colors (18R, 18G, 18B) may be replaced with a full-color LED element having three-chip LED of red, green and blue inside (also referred to as 3 in 1 typed full-color LED) to minimize the disposing space. The full-color LED as used herein is an element equipped with chip LEDs of three colors in one socket, and is capable of modulating the light into various colors including white by mixing colors with a light diffusing cover. When the LED elements of three colors (18R, 18G, 18B) are disposed, irradiation directions of each color will be fixed; however, if a full-color LED is adopted, irradiation direction will not be fixed according to color.

Moreover, although it is not shown in FIG. 3, a small mercury lamp or a small neon lamp may be added to this arrangement. Accordingly, the small mercury lamp can be used as a reference light source for wavelength calibration on the short wavelength (high wavenumber) side of the Raman microscope. Moreover, the small neon lamp can be used as a reference light source for wavelength calibration on the long wavelength (low wavenumber) side of the Raman microscope.

Figure 4:
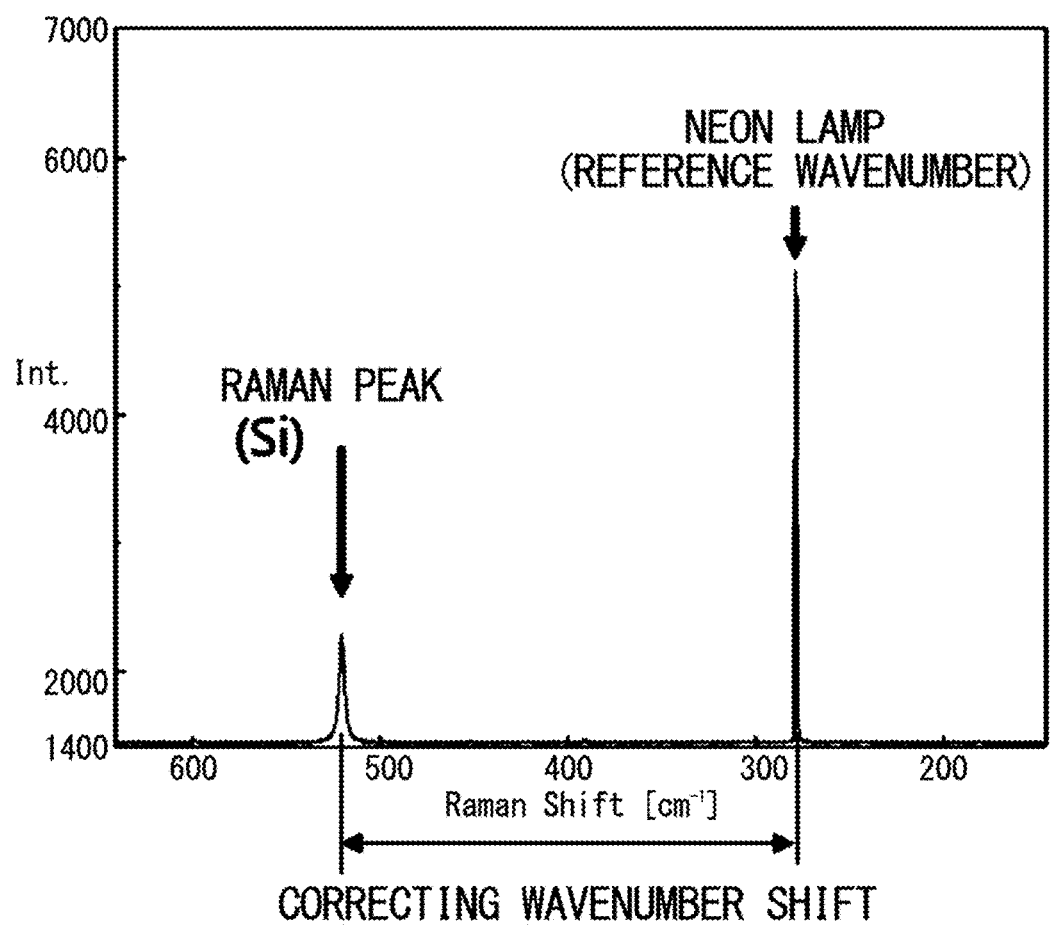
FIG. 4 is an explanation diagram of wavenumber calibration using a neon lamp of the filter unit.

For example, Raman spectra of the sample can be measured while the small mercury lamp or small neon lamp is illuminated. By measuring spectra of the neon lamp and Raman spectral signals simultaneously, a shift of the Raman peak is observed during wavenumber calibration. FIG. 4 is a Raman spectral diagram for describing wavenumber calibration using the neon lamp. For example, when a stress is applied to a sample such as silicon (Si), a shift in Raman peak occurs. Although it is a slight shift, if Raman spectral measurement is continued as it is, change over time of the stress occurs in accordance with temperature change or the like, and analysis by Raman spectra becomes difficult. Hence, as shown in FIG. 4, by determining the spectral peak of the neon lamp to the reference wavenumber and calibrating the position of the Raman peak of the sample, Raman spectra can be analyzed without being affected by the shift caused by stress or the like. On the other hand, this principle may be used to perform stress analysis of silicon (Si) of semiconductor materials.

From the fluorescent image observed by irradiation of various LED elements, the excitation laser suitable for Raman observation is selected, and Raman observation of which influence of fluorescence is suppressed to minimum level can be performed.

Next, action of the filter unit 1 is described. That is, a ring-shaped UV irradiation to a sample S and guiding of fluorescence emitted from the sample S are described with reference to FIG. 1.

As shown in FIG. 1, the filter unit 1 is supplied with a power source for irradiation from the Raman microscope side in a state that it is mounted to the Raman microscope. A power receiving terminal (not shown) provided to the filter unit 1 receives the power source. Accordingly, when the filter unit 1 is mounted to the microscope, the power source for irradiation is supplied to the filter unit 1, and a predetermined LED element or small lamp emits light by an irradiation control circuit or the like installed therein to perform UV irradiation or RGB illumination.

A case of UV irradiation is described here. The filter unit 1 forms a ring-shaped UV light by light emission of the UV-LED elements 18, and the UV light enters the dark-field objective lens unit 2. In the dark-field objective lens unit 2, the ring-shaped UV light from the filter unit 1 proceeds in a direction parallel to the central axis inside the dark-field objective lens unit 2, and is condensed to a measurement portion of the sample S by a ring-shaped lens 26. The sample S can be irradiated with UV light in dark-field by such action.

In cases of RGB illumination and illumination by other mercury lamps or neon lamps, it is performed in a manner similar to that of UV irradiation.

When the sample S emits a fluorescence by UV irradiation or RGB illumination, the fluorescence is condensed by a bright-field lens 24 to become a parallel light, and exits from the dark-field objective lens unit 2. The fluorescence enters the long-pass filter 16 of the filter unit 1. This long-pass filter 16 is a filter provided to prevent the UV light from the sample side entering the Raman observation optical system and the visible observation optical system of the Raman microscope, and transmits a light on the long wavelength side than the UV light. That is, it cuts a rebounded UV light from the sample S.

As shown in FIG. 1, the fluorescence that passed the long-pass filter 16 is guided to an imaging means (camera) C1. A fluorescence observation image taken by the imaging means C1 is sent to an image processing means 5, and a wavelength range of the fluorescence based on the fluorescence observation image is read out. An excitation wavelength selecting means 6 selects an excitation wavelength having a wavelength different from the read-out wavelength range of the fluorescence as an excitation wavelength for Raman observation. Then, a laser automatic switcher SW1 switches to an excitation laser in accordance with the selected excitation wavelength.

Raman Microscope

Figure 5:
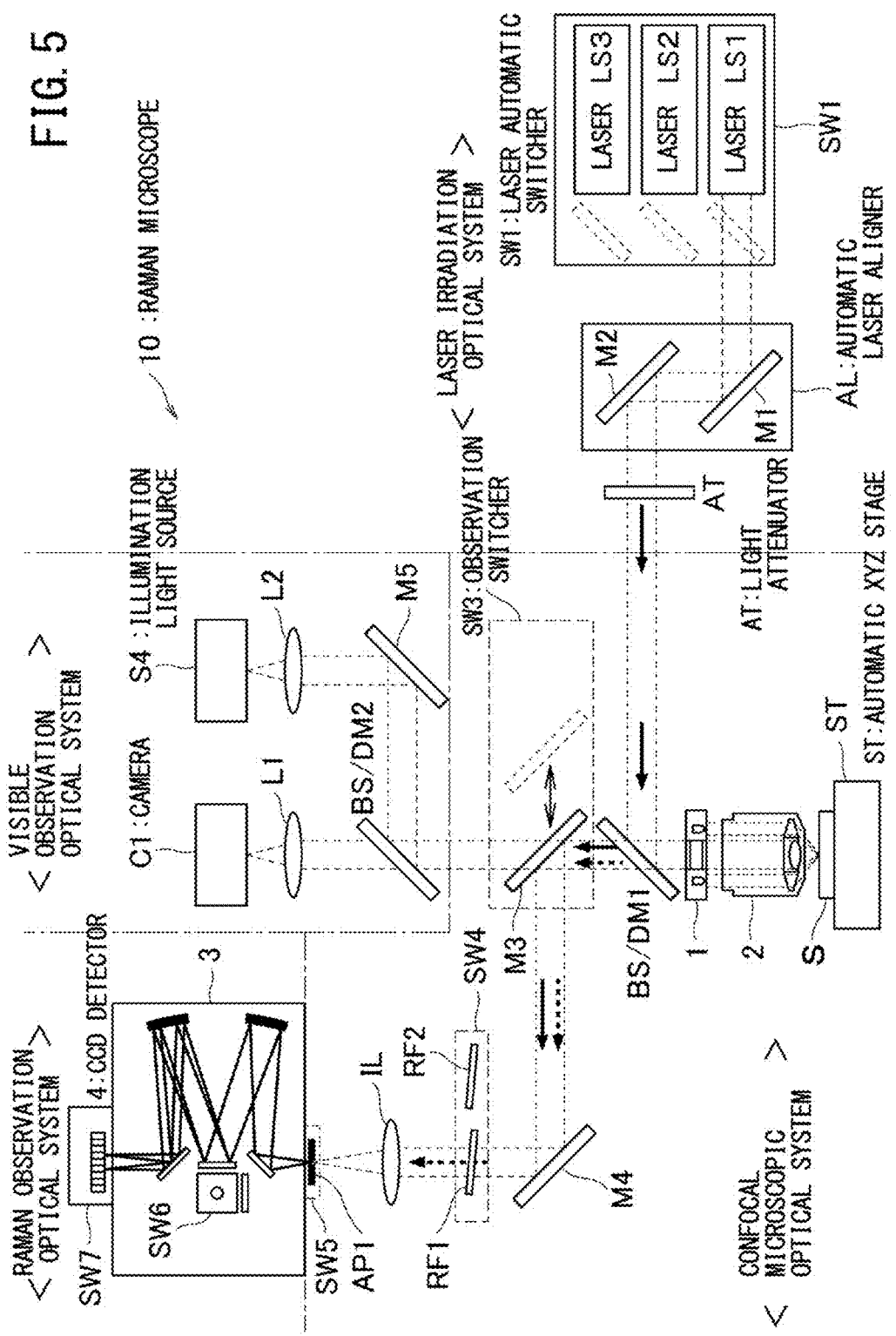
FIG. 5 shows an entire configuration of the Raman microscope including the filter unit of FIG. 1.

Next, the Raman microscope 10 comprising the filter unit 1 is described based on FIG. 5 to FIG. 7. The Raman microscope 10 is a device for spectrally detecting a Raman scattering light from the sample S that is generated when an excitation laser light is irradiated to obtain spectral data. A laser irradiation optical system, a confocal microscopic optical system, a Raman observation optical system, and a visible observation optical system of the Raman microscope 10 are described separately, as shown in FIG. 5, for convenience to describe the Raman microscope 10.

The laser irradiation optical system comprises: an excitation laser LS1; a pair of automatic alignment mirrors M1, M2 that are set to an automatic laser aligner AL; a light attenuator AT; and a beam splitter BS/DM1. Here, the excitation laser LS1 can be provided in a state that it is set to the laser automatic switcher SW1 with excitation lasers LS2, LS 3 having different excitation wavelengths.

The excitation light from the excitation laser selected from lasers LS1 to LS3 is subjected to optical-axis adjustment by the automatic laser aligner AL and light-intensity adjustment by the light attenuator AT, and enters the beam splitter BS/DM1. The beam splitter BS/DM1 reflects the excitation light toward the filter unit 1 and the dark-field objective lens unit 2. A beam spot of the excitation light having a circular cross-section is formed on the sample S. Moreover, the beam splitter BS/DM1 transmits the Raman scattering light from the sample S that is condensed by the dark-field objective lens unit 2.

The confocal microscopic optical system comprises: an automatic XYZ stage ST; the dark-field objective lens unit 2; the filter unit 1; a pair of mirrors M3, M4 for changing the optical path of the Raman scattering light; a rejection-filter automatic switcher SW4; an imaging lens IL; and a confocal aperture AP1 in front of a spectrometer.

The Raman scattering light from the sample S that is condensed by the dark-field objective lens unit 2 transmits through the filter unit 1 and the beam splitter BS/DM1, and is guided to the rejection-filter automatic switcher SW4 as a parallel light flux by the pair of mirrors M3, M4. The rejection-filter automatic switcher SW4 selects one rejection filter among a plurality of rejection filters (band-blocking filters) RF1, RF2 set to the switcher SW4, and only the light that passed the selected filter is guided to the imaging lens IL. The confocal aperture AP1 is a plate-shaped portion having a pore. It is selected in accordance with the sample among a plurality of apertures having pores of different size, shape or position, and is positioned on an imaging face of the imaging lens IL. An aperture switching means SW5 capable of switching a plurality of apertures increases confocal property in Raman observation, and is used as a means to improve spatial resolution. Spatial resolution can be improved without changing the measurement position of the sample. When spatial resolution increases, fluorescent components attenuate. For example, when a portion having a strong fluorescence is detected from the fluorescence observation image, the aperture of the aperture switching means SW5 is switched to improve spatial resolution. If the fluorescence is still strong even the aperture is switched, the excitation laser may be switched by the laser switching means. Accordingly, suitable Raman spectra can be obtained.

The Raman observation optical system comprises a spectrometer 3, and a CCD detector 4. The spectrometer 3 has a switching means SW6 that switches a diffraction grating, and can be switched to a suitable diffraction grating in accordance with the excitation laser. Moreover, the CCD detector 4 is capable of switching to a suitable detector in accordance with the excitation laser by the switching means SW 7 of the detector. Since the Raman scattering intensity is so weak such that it is inversely proportional to the fourth power of the excitation wavelength light intensity, the CCD detector 4 is switched in accordance with the excitation wavelength, so that a detector having a good sensitivity to the wavenumber of the Raman scattering light can be selected.

The visible observation optical system comprises: an observation switcher SW3 that makes the position of the mirror M3 online or offline; a beam splitter BS/DM2; a lens L1; an observation camera (imaging means) C1; a mirror M5; a lens L2; and an illumination light source S4.

Since the Raman microscope 10 of the present embodiment comprises the filter unit 1 on the optical axis between the dark-field objective lens unit 2 and the beam splitter BS/DM1, it is possible to perform UV irradiation by dark-field to the sample S. The fluorescence emitted from the sample S transmits through the long-pass filter 16 of the filter unit 1 to be observed by the visible observation optical system. Accordingly, a fluorescence observation function of dark-field can be imparted to the Raman microscope 10.

When shifting from fluorescence observation to Raman observation, the Raman scattering light from the sample that is excited by the laser transmits the long-pass filter 16 to be observed by the Raman observation optical system, so that observation can continue while the filter unit 1 is still mounted.

FIGS. 6 (A) and (B) show a guide line of light in a bright-field visible observation mode and a dark-field fluorescence observation mode of the Raman microscope 10 of the present embodiment.

In the bright-field visible observation mode, observation of the sample by a visible light by using the visible observation optical system of the Raman microscope 10 is performed. In this case, an illumination light from the illumination light source S4 of the visible observation optical system is irradiated to the sample, and the reflected light from the sample is captured by the camera C1. The image 6A is a visible observation image of fluorescent particles (the dark part) dispersed on a slide glass.

On the other hand, in the dark-field fluorescence observation mode, fluorescence observation of the sample by the filter unit 1 and the visible observation optical system of the Raman microscope 10 is performed. The UV light from the UV-LED elements 18 of 375 nm excitation, for example, provided to the filter unit 1 is irradiated to the sample in dark-field, and the fluorescence from the sample is captured by the camera C1. The image 6B is a fluorescence observation image by dark field of fluorescent particles (the bright part) dispersed on the slide glass same as the image 6A.

The method of selecting the excitation laser is described with reference to FIG. 7.

In the bright-field visible observation mode, the target measurement portion is set into a field based on the bright-field visible observation image of the sample like the image 7A. Here, a fluorescent pigment is used as the sample. The sample is shown in the lower half region of the image 7A, and it can be seen that the fluorescent pigments (the dark part) are distributed granularly.

Next, it is switched to the dark-field fluorescence observation image mode. As a light irradiated to the sample, one or a combination of two or more is selected from various light sources (UV light, RGB light, small mercury lamp light, neon lamp light, etc.) that are equipped to the filter unit 1. Here, a case when a UV-LED (375 nm excitation) is selected is described.

The sample is excited by the UV-LED light to obtain the dark-field fluorescence observation image. The image 7B is a fluorescence observation image, and the bright part shows the fluorescent pigments. Accordingly, intensity of self-fluorescence of the sample can be grasped. In order to clarify which color strongly appears in the fluorescence, a CCD camera equipped with an RGB color filter may be adopted to the camera C1 to obtain fluorescence images for each three primary colors. The fluorescence images disassembled into three colors (each image of Red, Green, Blue in the image 7C) is processed to show brightly when the component of the color is strong. In a case of the fluorescence images given as the example here, it can be seen that the fluorescent components of "red" and "blue" are hardly detected, whereas the fluorescent component of "green" is strongly detected.

In the present embodiment, the Raman microscope 10 comprises an image processing means 5 that detects the wavelength range of the fluorescence from the fluorescence observation image by a known technique, and an excitation wavelength selecting means 6 that selects the excitation wavelength of the excitation laser such that the excitation wavelength is not in the wavelength range of the detected fluorescence. An excitation laser of the long wavelength side than the wavelength range of the detected fluorescence may be selected.

As in the above-identified example, the intensity of the fluorescence separated into three colors is compared with a threshold of brightness that is set in advance to the fluorescence image of each color by the image processing means 5 to determine in which color's wavelength range the fluorescence is emitted strongly. The Raman microscope 10 may be configured to select the excitation laser such that the fluorescence is not within the determined wavelength range of the fluorescence (for example, becomes a long wavelength side than the wavelength range of the fluorescence).

Use of the excitation laser of 532 nm that is close to the wavelength range of "green" in which the fluorescence was the strongest is avoided for the fluorescent pigments of FIG. 7. For example, other than a 532 nm visible laser that is a standard excitation laser, when visible lasers of 488 nm excitation, 633 nm excitation, 785 nm excitation, etc., a 1064 nm infrared laser, and a 325 nm UV laser can be selected, the 785 nm visible laser or the 1064 nm infrared laser may be selected as the excitation laser suitable for the fluorescent pigment. The image SP71 shows Raman spectra of when the 785 nm visible laser is selected. As shown in this image, it can be seen that good spectral data of which fluorescence is avoided can be obtained. As a comparison, Raman spectra of when the 532 nm visible laser is selected is shown as the image SP72. In the 532 nm visible laser, influence of the fluorescence is strong, Raman spectra is buried in the fluorescence, and S/N ratio is deteriorated.

<Effect of the Present Embodiment>

As described, the excitation laser having a suitable excitation wavelength can be selected from the excitation lasers LS1 to LS3 provided in the excitation optical system of the Raman microscope 10 based on the dark-field fluorescence observation image using the filter unit 1. It can be switched automatically to the selected excitation laser by using the laser automatic switcher SW1 of FIG. 5. In the Raman microscope 10 of the present embodiment, Raman spectra of which influence of the fluorescence is avoided can be measured by using the suitable excitation laser.

Moreover, the filter unit 1 is mounted to the Raman microscope 10 on an optical axis of the dark-field objective lens unit 2, the optical axis on a side opposite to the sample side with the dark-field objective lens unit 2 at a center. For example, the filter unit 1 can be set detachably to a revolver for the dark-field objective lens unit 2. By only setting the filter unit 1 to the revolver, a dark-field fluorescence observation function can be easily imparted to the Raman microscope 10.

The filter unit 1 of the present embodiment is a long-pass filter unit with a dark-field UV irradiation function. Its long-pass filter 16 does not affect irradiation by the excitation laser on the Raman microscope side at all. Therefore, after fluorescence observation by the filter unit 1, Raman observation can be performed while the filter unit 1 is still mounted thereto. Detachment action of the filter unit 1 becomes unnecessary when shifting from fluorescence observation to Raman observation, and usability of the Raman microscope improves.

A ring-shaped UV light is emitted from the UV-LED elements 18 of the filter unit 1 toward a ring-shaped lens 26 of the dark-field objective lens unit 2, and the sample is irradiated in dark-field by the ring-shaped lens 26. Instead of the UV light, a monochromatic light from monochromatic LED elements 18R, 18G, 18B can be irradiated to the sample in dark-field. By irradiating the UV light, the monochromatic LED light, or a combination thereof selectively to the sample, a reflectance of the sample or a property of self-fluorescence can be obtained as the observation image under various excitation conditions, and a more suitable excitation wavelength can be selected.

Moreover, the fluorescence generated from the sample is condensed by the bright-field lens 24 that is positioned on the optical axis of the dark-field objective lens unit 2, and proceeds toward the long-pass filter 16 of the filter unit 1. The long-pass filter 16 eliminates the rebounded UV light from the sample, and the fluorescence from the sample proceeds to the visible observation optical system of the Raman microscope 10.

The Raman microscope 10 comprises the laser irradiation optical system, the confocal microscopic optical system, the Raman observation optical system, and the visible observation optical system. The fluorescence generated by irradiation of the UV light from the filter unit 1 passes through the long-pass filter 16 to be observed in the visible observation optical system. In the Raman microscope 10 having such configuration, the filter unit 1 only needs to be mounted to the revolver of the dark-field objective lens unit 2, so that a light source for fluorescence observation or an optical system switching mechanism does not need to be provided inside the Raman microscope 10.

Hereinbelow, a characteristic Raman observation method by the Raman microscope 10 of the present embodiment is described.

Observation of Curing Process of UV Curing Resin

Here, a method of observing curing process of the sample by UV irradiation is described. This curing process is based on varying a state of which a specific wavelength peak of Raman spectra falls down (attenuates).

In a conventional observation of the curing process of the UV curing resin, it was necessary either to configure UV irradiation to the sample as a transmission optical system, or to perform UV irradiation from a direction perpendicular or diagonal to a measurement optical axis to the sample. In order to adopt the former transmission optical system, a condition that the sample itself needs to be made of a transmittable material is added. Moreover, in a case of the latter, a space for inserting an exiting port of a bundle fiber for UV irradiation to a gap between the objective lens and the sample needs to be secured, and a low-magnification objective lens having a long operation distance needs to be selected.

By observing the curing process of the UV curing resin by the Raman microscope 10 comprising the filter unit 1 of the present embodiment, a gap between the dark-field objective lens unit 2 and the sample can be made smaller, a high-magnification objective lens can be used, and changes of the UV curing resin can be observed in more detail.

Figure 8A:
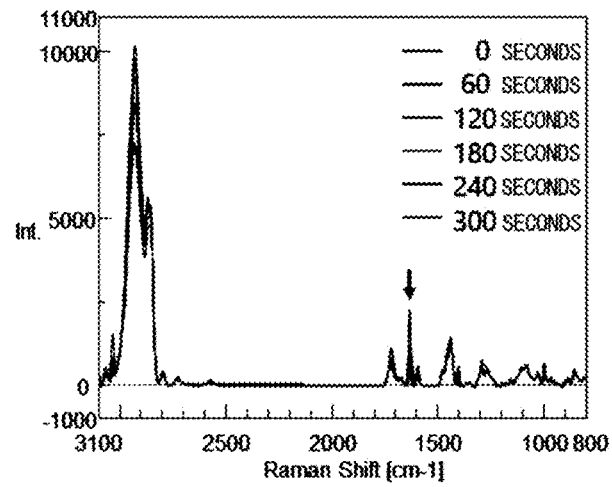
FIG. 8A, FIG. 8B and FIG. 8C are graphs that show results of Raman observation of a curing process of a UV curing resin.
Figure 8B:
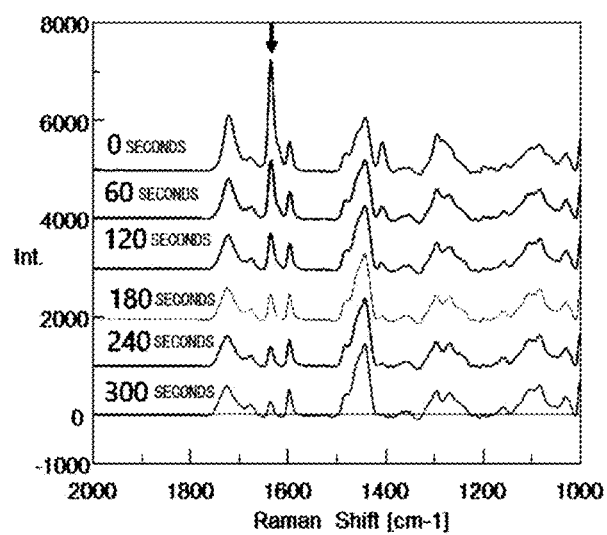
Figure 8C:
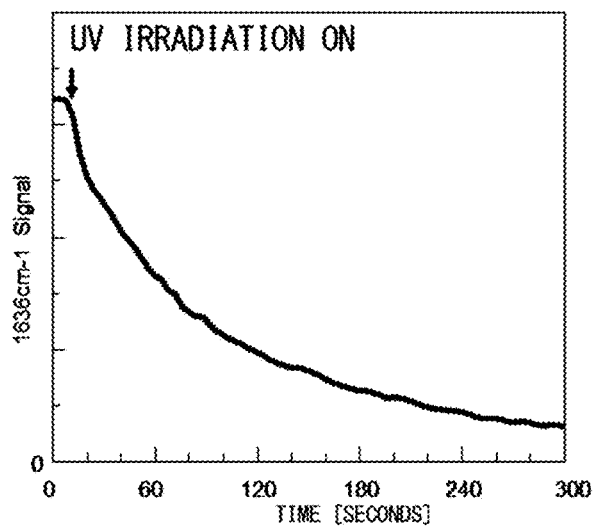

An example of the observation result of the curing process is shown in FIGS. 8 (A) to (C). While an ultraviolet light curing resin (manufactured by Koyano Manufacturing Company) having acrylic monomer as the main component is irradiated with the UV light from the UV-LED elements 18 of the filter unit, Raman spectra of the curing process was measured at intervals of 60 seconds with an exposure time of two seconds. FIG. 8 (A) is the Raman spectra thereof. The vertical axis shows a scattering intensity, and the horizontal axis shows a Raman shift ($cm^{-1}$). Measurement data of the wavenumber range of $1000\ cm^{-1}$ to $2000\ cm^{-1}$ in FIG. 8 (A) is enlarged and shown in FIG. 8 (B). It can be seen that weak Raman peaks are detected in detail. As irradiation of the UV light to the UV curing resin is repeated, a state that a peak considered to be C=C stretching vibration in the vicinity of $1640\ cm^{-1}$ is attenuating can be clearly observed. FIG. 8 (C) is a graph showing time change of Raman signal intensity of $1636\ cm^{-1}$. By using the Raman microscope 10 of the present embodiment, a process of attenuation of a specific Raman peak can be monitored at a high precision.

As described, by focusing on a specific Raman peak that is highly related to the curing process of the resin among Raman spectra and observing how the Raman peak increases or decreases in accordance with irradiation time of the UV light, a curing state of the resin can be evaluated.

Application to Sample Search

By dark-field visible observation using RGB light emitting elements 18R, 18G, 18B, it is possible to find out which color appears the most when the sample is irradiated with the three primary colors of light in order. That is, the RGB light emitting elements 18R, 18G, 18B provided to the filter unit 1 are made to emit light by each color to irradiate to the sample. The reflected light from the sample is imaged for each irradiated color by the imaging means C1 of FIG. 1. The image processing means 5 measures reflectance of the light of each color of the RGB light emitting elements 18R, 18G, 18B based on the imaged observation image. Then, a sample recognizing means 7 captures a distribution state of microscopic foreign matters in the sample based on the measured reflectance. It is an effective means as a function to recognize a small measurement target dispersed in observation field by using contrast of the image (sample search function).

FIG. 9 are images that imaged observation images (9A, 9R, 9G, 9B) of each sample of a case when the sample was illuminated simultaneously with three colors by the RGB light emitting elements 18R, 18G, 18B, and a case when illuminated monochromatically. Toners of three colors (cyan C, magenta M, yellow Y) for printers are mixed to be used as the sample. From the observation image obtained by monochromatic illumination, it can be seen that distribution of the measurement target differs for each color. By using this, a sample recognizing function capable of recognizing a distribution state of microscopic measurement targets that are easily overlooked when all of the light emitting elements are irradiated simultaneously can be achieved.

Figure 10A:
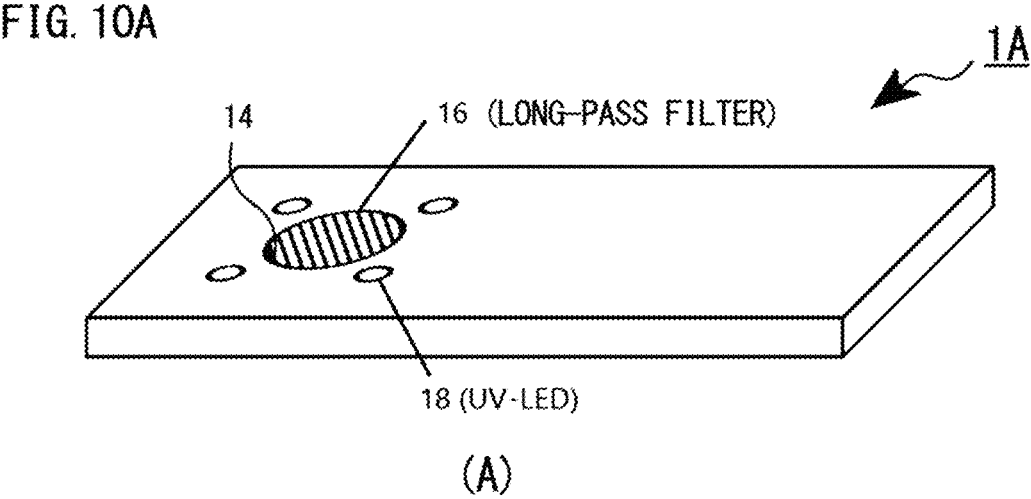
FIG. 10A is a perspective view that shows a modification of the filter unit.
Figure 10B:
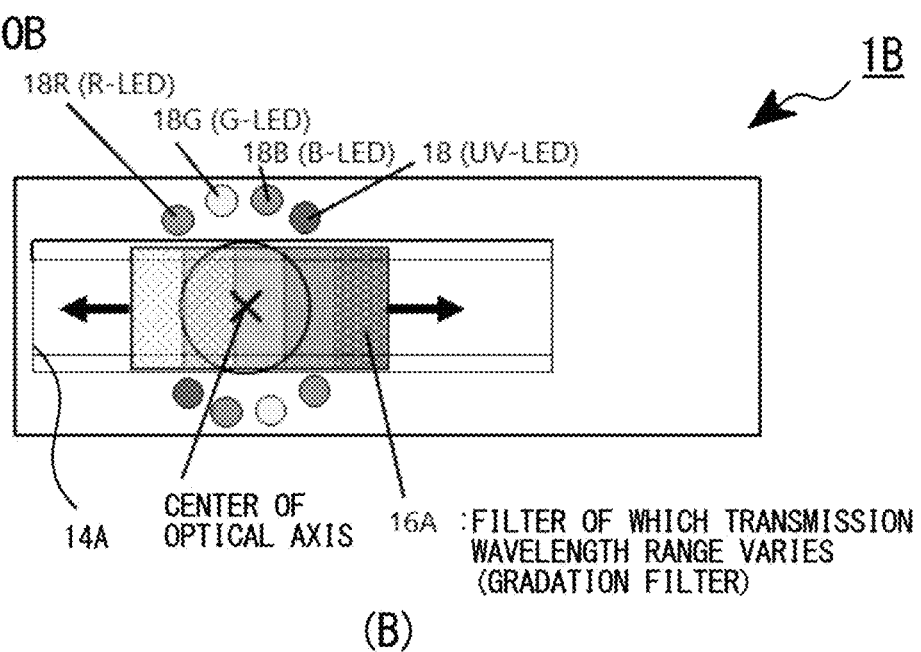
FIG. 10B is a planar view that shows another modification of the filter unit.

FIG. 10 (A) is an example of a filter unit 1A having the UV-LED elements 18 disposed at four corners of the window frame. Moreover, in the example of FIG. 10 (B), a gradation typed long-pass filter 16A having a transmission wavelength range that differs in accordance with the position on the filter is employed to the filter unit 1B. The long-pass filter 16A is supported such that it can slide on the circular opening of the window part 14 A. The long-pass filter 16A is slidable manually or electrically while the filter unit 1B is mounted to revolver or the like. By changing its sliding position, the wavelength range that transmits the long-pass filter 16A can be adjusted easily in accordance with the measurement condition.

DESCRIPTION OF REFERENCE NUMBERS 1, 1A, 1B Filter unit
2 Dark-field objective lens unit (dark-field objective lens unit)
3 Spectrometer
4 CCD detector
5 Image processing means
6 Excitation wavelength selecting means
7 Sample recognizing means
10 Raman microscope
12 Frame body
14, 14A Window part
16 Long-pass filter
16A Gradation filter
18 UV-LED element (UV light emitting element)
18R, 18G, 18B Each element of RGB light emitting elements
24 Bright-field lens (Bright-field objective lens)
26 Ring-shaped lens
C1 Camera (fluorescence imaging means, reflected light imaging means)
LS1-LS3 Excitation laser
SW1 Laser automatic switcher

What is claimed is:

1. A Raman microscope for measuring Raman spectra of a sample, the Raman microscope comprising:
    a plurality of UV light emitting elements that are disposed around an optical axis that joins a sample and a bright-field objective lens, and emits UV light along the optical axis;
    a ring-shaped lens that is disposed on the same side as the bright-field objective lens relative to the sample to irradiate the UV light from the plurality of UV light emitting elements to a measurement portion on the sample by a dark-field irradiation, and
    a long-pass filter that is disposed on the optical axis on the side opposite to the sample side with the bright-field objective lens at a center and that transmits a light having a wavelength longer than the wavelength of the UV light,
    a filter assembly comprising a frame, the plurality of UV light emitting elements and the long-pass filter,
    wherein the plurality of UV light emitting elements are disposed around a window part of the frame,
    wherein the long-pass filter is positioned in the frame to cover the window part of the frame, and
    wherein the filter assembly is removably attachable to a support of the bright-field objective lens and the ring-shaped lens.

2. The Raman microscope according to claim 1 further comprising:
    a camera that takes an image of a fluorescence from the sample through the bright-field objective lens and the long-pass filter sequentially, and an excitation wavelength selector that selects an excitation wavelength for Raman spectral measurement based on a fluorescence observation image imaged by the camera.

3. The Raman microscope according to claim 2 for observing curing process of a resin.

4. The Raman microscope according to claim 1 for observing curing process of a resin.

5. The Raman microscope according to claim 1, wherein
in addition to the UV light emitting elements, at least one set of RGB light emitting elements or at least one full-color light emitting element for irradiating light of a plurality of colors to the sample is disposed around the optical axis; and the Raman microscope comprises:

a camera that takes images of a reflected light of each color from the sample through the bright-field objective lens and the long-pass filter sequentially; and a sample recognizer that recognizes the sample distributed in a field of the camera based on observation images for each color imaged by the camera.

6. The Raman microscope according to claim 1, wherein in addition to the UV light emitting elements, at least one set of RGB light emitting elements or at least one full-color light emitting element is disposed around the window part.

7. The Raman microscope according to claim 1, wherein in addition to the UV light emitting elements, a mercury lamp and/or a neon lamp as a reference light source for wavenumber calibration of the Raman microscope is disposed around the window part.

8. The Raman microscope according to claim 1, wherein the long-pass filter is a gradation filter of which a wavelength range of transmission varies in accordance with a position, and is supported to be shiftable along a changing direction of the wavelength range in the window part.

* * * * *